Feb. 5, 1935. C. W. LEGUILLON 1,989,704
METHOD OF MAKING DECORATIVE RUBBER ARTICLES AND PRODUCT THEREOF
Original Filed July 13, 1932
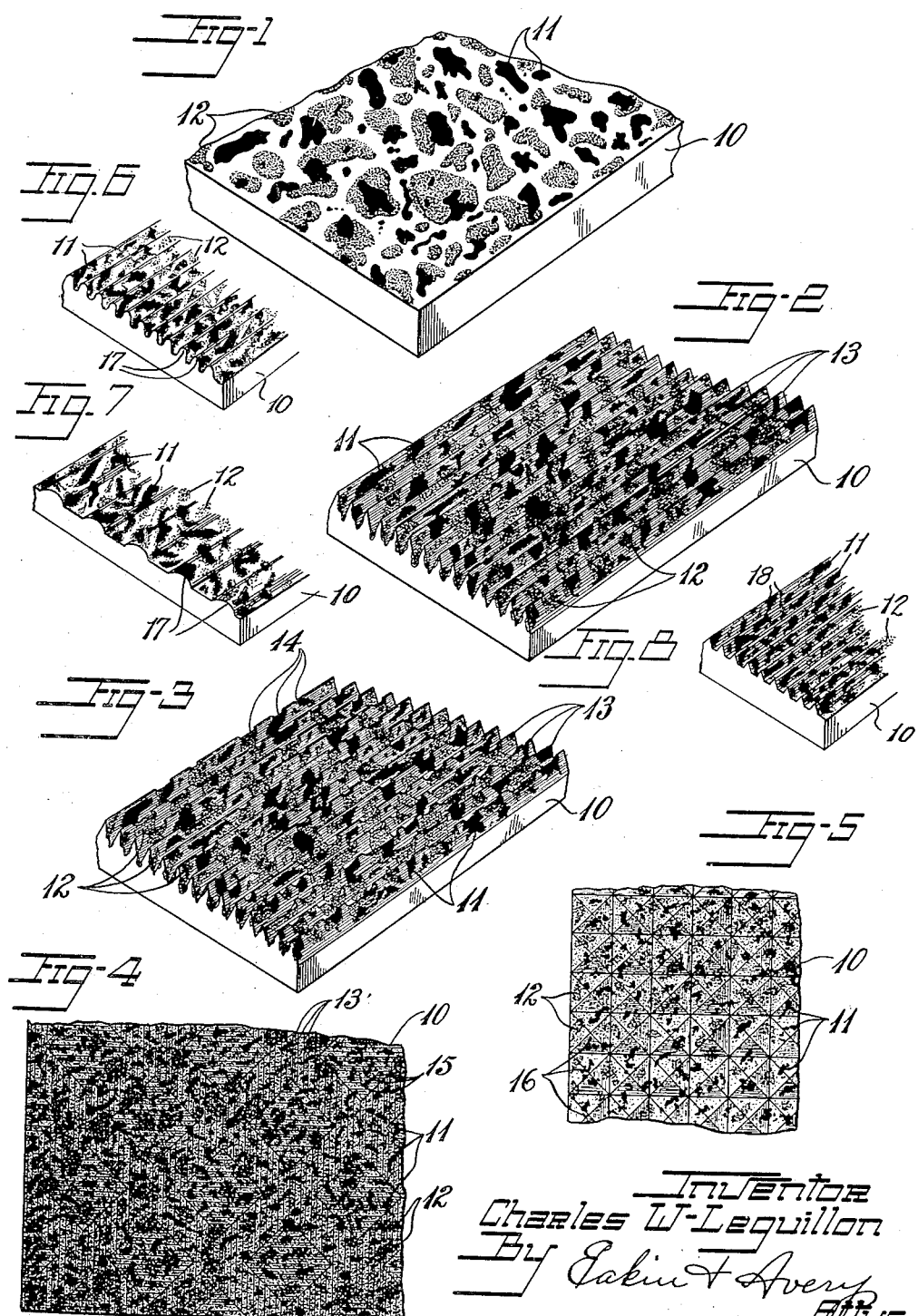
Inventor
Charles W. Leguillon
By Eakin & Avery
Attys.

Patented Feb. 5, 1935

1,989,704

UNITED STATES PATENT OFFICE 1,989,704

METHOD OF MAKING DECORATIVE RUBBER ARTICLES AND PRODUCT THEREOF

Charles W. Leguillon, Akron, Ohio, assignor to The B. F. Goodrich Company, New York, N. Y., a corporation of New York Application July 13, 1932, Serial No. 622,241
Renewed August 21, 1934

20 Claims. (Cl. 18—61)

This invention relates to rubber manufacture and particularly to the manufacture of decorative rubber articles having a surface simulating in its light reflecting characteristics fibrous coverings, such as velvet, or other napped and pile fabrics.

Rubber articles heretofore manufactured, whether of a single color, or multicolored, mottled, or otherwise decorated, have presented a flat lifeless "rubbery" appearance notwithstanding numerous attempts to make articles possessing the valuable physical properties of rubber without at the same time producing the undesirable characteristic appearance of rubber. This inability to manufacture such decorative rubber articles has constituted a serious bar to the further adoption of rubber for many uses where an attractive article is desirable.

An object of the present invention is to manufacture durable rubber articles possessing a type of beauty heretofore unachieved in rubber manufacture. A further object of the invention is to manufacture rubber articles presenting a lustrous vari-colored surface simulating velvet, or other napped and pile fabrics, and which is not recognized readily as rubber by a casual observer. It is also the object of the invention to provide an effective, satisfactory and economical method of making articles having such decorative surface characteristics.

It is not possible at this time accurately to describe the decorative effects obtained through the practice of the present invention or satisfactorily to explain the precise reasons or factors contributing, and the manner in which they contribute, to produce the striking results observed in articles so produced. Consequently, although certain theories and explanations are hereinbelow advanced as to the invention herein set forth, it is to be understood that it is not the intent to limit the invention in any way thereby.

Broadly, the present invention comprises fabricating the body of an unvulcanized rubber article from a suitable rubber composition, and then both physically and colorimetrically interrupting the continuity of the light reflecting and/or light absorbing areas of its surface in such manner that instead of direct reflected light rays alone, the eye of an observer, upon viewing the article, receives a multiplicity of light stimuli of varying intensity and quality forwarded to the eye from innumerable angles, thereby creating a confused optical image to the exclusion of the formation of well-defined or clear cut images. As a consequence of the reception by the eye of a jumbled confusion of diffused stimuli, instead of the familiar distinct flat dull rubbery appearance, the surface configurations of the article appear indistinct in exact outline, and soft and shimmery, presenting a lustrous sensation of depth which can best be described by comparison with the appearance of a deep pile fabric, or velvet, and like fibrous materials.

The necessary colorimetric discontinuity is obtained by providing upon the surface of the article a multiplicity of localized preferably irregular intermingled discrete areas suitably pigmented to produce surface areas of at least three substantially different light reflectivities, one group of which for convenience may be exposed portions of the body of the article proper.

Best results are obtained when the light reflectivities of exposed surface areas vary as widely as possible. Since areas of at least three different reflectivities appear to be necessary in this invention, it is preferred to employ in combination areas of high, low, and intermediate reflectivities. The highly reflecting areas may be any color (considering white and black as colors) such as aluminum, silver, bright yellow, white, etc., which reflects a greater proportion of incident light than it absorbs; while conversely, the areas of low reflectivity may be black, dark blue, dark grey or like color which absorbs a greater portion of incident light than it reflects. The areas of intermediate reflectivity may be any color having a reflective power between those of the other two colors chosen, but are preferably the strong colors, such as reds, blues, greens and the like, which serve to impart color tone to the article.

Additional areas of different reflectivities may be employed, but such additional areas apparently have no marked effect upon the appearance of the article other than to slightly modify the shade or color tone.

Obviously the reflectivities and proportions of the several areas may vary widely according to the particular shade, color tone, or other effect desired, and the terms "high", "low", and "intermediate" reflectivity as used herein are entirely relative and vary in their degree of reflectivity with different color combinations used.

In ordinary rubber articles, the individual reflective areas of any intensity should preferably be relatively small, varying in size from small dots to somewhat larger areas, say about one-half square inch as a maximum, if best results are to be obtained. The areas are likewise preferably of irregular configuration and should be intermingled and disposed in chance arrangement but substantially uniformly distributed over the article surface in such manner as to supply the proper blending of light stimuli to an observer.

The reflective areas may be provided in a number of manners as by dyeing localized areas of the article or by applying suitable pigments either in a liquid or dry state, but it is preferably accomplished by applying to the article surface liquid dispersions of rubber either in organic solvents, such as rubber cements, or in water, such as latex, such dispersions being suitably pigmented to produce, when dried, deposits of rubber of the desired colors and reflective characteristics. The liquid dispersions may be brushed, sprayed, printed or otherwise applied to the unvulcanized article surface and allowed to dry to produce deposits of pigmented rubber composition which upon vulcanization of the article in a mold under pressure, become embedded in and integral with the rubber body of the article.

Colorimetric discontinuity alone, however, will not produce the desired appearance. It has been found necessary to dispose the multitudinous reflective areas in a multiplicity of diffusion planes and thereby to increase diffusion and to decrease direct reflection of incident light rays, and thus further to contribute to the production of a confused image as viewed by an observer.

The term "diffusion plane" as applied to plane surfaces refers to the normal plane of the surface from which light from any source is reflected to the eyes of an observer. In the case of curved or irregular surfaces, the term is to be understood to refer to a plane tangent to the curved or irregular surface at any given point and representing the plane from which light diffusion occurs at that point upon the surface.

The necessary diffusion planes are conveniently provided by molding the article surface to produce a series of preferably regularly disposed projections of any desired configuration and preferably of the same or uniformly graduated size. The projections may take the form of a series of parallel ribs of triangular, trapezoidal, circular, parabolic, or other geometrical cross section. The parallel ribs may be broken intermittently by similar ribs disposed at an angle thereto in such manner as to produce decorative patterns in the surface which combined with the scintillating effects produce pleasing patterned designs. The surface projections providing the many diffusion planes may take other forms such as a series of pyramidal or conical surface projections or similar configurations. Superior decorative effects are obtained when the surface projections are comparatively small so that a greater number of diffusion planes may be provided in a given area.

The reflective characteristics of the article surface may be altered further by using in the reflective areas rubber stocks having shrinkage and/or flow characteristics differing substantially from those of the body stock. When such stocks are used in combination, differential flow and shrinkage of the stocks during and after vulcanization will produce irregular, though unitary surfaces. This effect is particularly pronounced when an article of masticated rubber composition is decorated with latex stocks and molded to provide a series of fairly steep triangular or like ribs. In manufacturing such an article, the latex decorating stocks frequently shrink more and/or flow less readily than the body stock and thereby produce a certain unevenness of the finished surface, in which the latex stock areas fall below the nominal rib peaks and surface levels, breaking the surface continuity and providing additional diffusion planes.

It is impossible adequately to illustrate the present invention in the conventional manner but an attempt has been made to portray in the accompanying drawing the physical features of several simple embodiments of the invention.

In the drawing:

Fig. 1 is an enlarged fragmentary perspective view of a rubber article in a preliminary state of manufacture according to one method of the present invention.

Fig. 2 is a like view of the article after molding and vulcanization is completed.

Fig. 3 is a like view of a similar completed article decorated with rubber stocks having shrinkage and/or flow characteristics differing substantially from those of the stock used in the body of the article.

Fig. 4 is a fragmentary plan view of a rubber article decorated according to the method of this invention and embodying a slightly modified type of surface projections.

Fig. 5 is a like view of a similar article embodying a further modified type of surface projections.

Figs. 6, 7, and 8 are like views of a similar article embodying other types of surface projections.

In a specific example of the method of practicing the present invention, the body 10 of an article is roughly formed from a rubber composition by any of the methods commonly practiced in rubber manufacture, including calendering, extruding, cold pressing and like forming means, and obviously may or may not be associated with other elements of rubber or other material to form the roughly shaped unvulcanized article.

Thereafter at least two different colored aqueous dispersions of rubber are preferably sprayed onto the surface of the body 10 and dried to produce a multitude of reflective areas 11 and 12 intermingled and substantially uniformly distributed over the surface area leaving intermediate areas of the underlying body stock exposed to serve as the third group of reflected areas.

A typical combination of effective colors and reflectivities is obtained when the body stock is black, furnishing at its exposed portions areas of low reflectivity, with one group of applied reflective areas pigmented with aluminum powder to produce areas of high reflectivity, and the second group pigmented with a green dye such as "Vulcafor green L" to supply the color tone areas of intermediate reflectivity.

The article is then placed in a mold adapted to break the colorimetrically discontinuous surface into a multitude of diffusion planes, which may take the form of a series of parallel triangular ribs or corrugations 13, and the rubber vulcanized under heat and pressure. During vulcanization, the applied reflective areas 11 and 12 are in effect embedded in the surface of the body 10 to produce a unitary integral surface following the mold contours. However, if the shrinkage and/or flow characteristics of the body stock and the decorating stocks differ substantially, the decorating stocks may fail to flow into, so as to fill completely all the mold recesses or may shrink more than the body stock and so produce surface irregularities and additional diffusion planes indicated at 14 in Fig. 3.

Numerous modifications in the configuration of the surface projections are possible including the design comprising parallel ribs 13 intermittently broken by similar ribs 15 disposed at an angle thereto as illustrated in Fig. 4, the regularly disposed pyramidal projections 16 shown in Fig. 5, and also the curvilinear ribs 17 illustrated in Figs. 6 and 7, or the triangular ribs 18 shown in Fig. 8.

When the finished article is viewed from a distance of a few feet it presents a soft deep appearance strikingly similar to that of pile fabric. Instead of the familiar dull lifeless appearance of prior rubber articles, the product of this invention appears lively, scintillating and ever-changing in color tones and quality. Depending upon the particular relation of the article surface, the source of light, and the position of the observer, the article may seem any one of a range of color shades ranging from a very light to a very dark green. This effect together with the scintillation of the highly reflective areas causes the article to present an ever changing appearance to one who walks past it or otherwise changes his point of view, much as does velvet and other like pile fabric.

The distinct luster or sheen coupled with the sensation of depth observed in articles made according to this invention render it particularly useful in making decorative floor mats which may be used instead of pile carpets, but it is equally valuable in decorating any ordinary rubber article, including tires, hose, footwear, water bottles, bath caps, table tops, hard rubber articles, toys, etc.

The term "rubber" has been used in a generic sense to include caoutchouc, balata, gutta percha and like natural or synthetic gums whether in the unvulcanized, vulcanized, or reclaimed condition. Likewise the term "dispersion of rubber" includes flowable liquids made by dispersing rubber as hereinabove defined in liquid vehicles, either solvents or non-solvents of rubber, and either with or without the aid of dispersing and/or stabilizing agents, as well as latices of rubber producing plants whether in the natural state or modified by dilution, concentration, and/or by the addition of thickening, thinning or other modifying materials. The rubber dispersions may contain fillers, pigments, vulcanizing agents, accelerators, age-resisters, softeners, and similar compounding ingredients.

I claim:

1. The method of making a decorative rubber article which comprises the steps of pigmenting localized areas of the article surface to provide a multiplicity of areas of at least three different light reflectivities and forming the surface into a multiplicity of diffusion planes.

2. The method of making a decorative rubber article which comprises fabricating the article from a rubber composition and then forming the article surface into a multiplicity of discrete areas of at least three substantially different light reflectivities disposed in chance arrangement in a multitude of diffusion planes.

3. The method of making a decorative rubber article which comprises roughly forming the body of the article from a rubber composition, then applying to the article surface a multitude of indiscriminately disposed discrete bodies of rubber decorating stocks of at least two substantially different light reflectivities, each differing substantially from the reflectivity of the body stock, and then molding the article to form the colorimetrically discontinuous surface into a multiplicity of diffusion planes.

4. The method of making a decorative rubber article which comprises roughly forming the body of the article from a rubber composition and then applying to the article surface in relatively small discrete portions at least two liquid dispersions of rubber each differing substantially in light reflectivity from the other and from the body composition, and then molding the article surface into a multiplicity of diffusion planes.

5. The method of making a decorative rubber article which comprises roughly forming the body of the article from a rubber composition and then providing upon the article surface a multiplicity of light reflective areas including highly absorptive areas, highly reflective areas, and color-tone areas of intermediate reflectivity, and then molding the surface into a multiplicity of diffusion planes.

6. The method of making a decorative rubber article which comprises roughly forming the body of the article from a rubber composition, then applying to the article surface in chance arrangement a multitude of discrete portions of at least two aqueous dispersions of rubber differing in color from each other and from the body composition, drying the dispersions, and vulcanizing the article in a mold designed to form the surface into a multiplicity of diffusion planes.

7. The method of making a decorative rubber article which comprises roughly fabricating the unvulcanized body of the article, applying to the surface thereof a multitude of localized deposits of at least two different rubber compositions suitably pigmented to constitute areas of substantially different light reflectivity, each differing substantially in reflectivity from the exposed portions of the body, and then molding the article to form a multiplicity of substantially regularly disposed surface projections constituting a multiplicity of diffusion planes.

8. The method of making a decorative rubber article which comprises fabricating the unvulcanized body of the article and applying to the surface thereof a multitude of indiscriminately disposed discrete portions of at least two different colored decorating stocks, each differing from the body stock both in light-reflective and shrinkage characteristics, and vulcanizing the article under pressure in a mold designed to form the surface into a multiplicity of diffusion planes, whereby the decorating stocks are embedded in the surface of the body stock, each contributing to produce a unitary surface following the mold contours and rendered irregular by the differential shrinkage of the stocks.

9. The method of making a decorative rubber article which comprises fabricating the unvulcanized body of the article, spraying onto the surface thereof at least two different colored aqueous dispersions of rubber, each differing from the body in light reflective characteristics, drying the dispersions and vulcanizing the article in a mold designed to form the surface into a multiplicity of diffusion planes.

10. A decorative rubber article having a multiplicity of exposed surface areas of at least three substantially different light reflectivities disposed in chance arrangement in a multiplicity of diffusion planes.

11. A decorative rubber article having exposed surface areas including light absorbing areas, light reflecting areas, and color-tone areas of intermediate reflectivity, disposed in chance arrangement in a multitude of diffusion planes.

12. A decorative rubber article comprising a body stock and a multitude of relatively small discrete portions of at least two decorating stocks differing in light reflectivity from each other and from the body stock, said decorating stocks being distributed in chance arrangement over the article surface and said surface having substantially regular projections presenting a multiplicity of diffusion planes.

13. A decorative rubber article having a surface presenting a multiplicity of intermingled exposed areas of at least three different light reflectivities, said surface having a multitude of substantially regularly disposed projections having irregular contours.

14. A decorative rubber article having a surface presenting a multiplicity of intermingled exposed areas of at least three different light reflectivities, said surface being formed into a series of parallel projecting ribs having discontinuous peaks.

15. A decorative rubber article having a surface presenting a multiplicity of intermingled exposed areas of at least three different light reflectivities, said surface comprising a series of substantially regularly spaced projecting ribs.

16. A decorative rubber article having a surface presenting a multiplicity of intermingled exposed areas of different light reflectivities, said surface comprising a series of substantially regularly spaced projecting ribs of triangular section.

17. A decorative rubber article having a surface presenting a multiplicity of intermingled exposed areas of different light reflectivities, said surface comprising a series of substantially regularly spaced projecting ribs of curvilinear section.

18. A decorative mold-vulcanized rubber article having a unitary surface presenting a multiplicity of intermingled areas of different light reflectivities, said areas being of varied relatively small sizes and irregular shapes, said surface comprising a series of substantially symmetrical molded projections disposed in regular arrangement.

19. A mold-vulcanized rubber article comprising a body of masticated rubber composition of one color and a multitude of relatively small irregularly shaped masses of unmasticated latex rubber of at least two additional colors flush-imbedded in the surface thereof in intermingled arrangement, said surface comprising a series of molded projections disposed in regular arrangement.

20. A mold-vulcanized rubber article comprising a body of masticated rubber composition of one color and a multitude of relatively small irregularly shaped masses of unmasticated latex rubber of at least two additional colors flush-imbedded in the surface thereof in intermingled arrangement, said surface comprising a series of substantially regularly spaced molded ribs.

CHARLES W. LEGUILLON.